United States Patent
Asaoka et al.

(10) Patent No.: US 6,349,203 B1
(45) Date of Patent: Feb. 19, 2002

(54) MOVING BODY TERMINAL DEVICE, INFORMATION PROVIDING DEVICE, INFORMATION PROVIDING SYSTEM, INFORMATION PROVIDING METHOD, AND MEDIUM HAVING RECORDED PROGRAM FOR THE MOVING BODY TERMINAL DEVICE

(75) Inventors: Taizo Asaoka, Toyota; Satoshi Yamada, Nisshin; Masatoshi Abo, Toyota; Masato Maruoka, Akashi; Masami Okada, Nagoya, all of (JP)

(73) Assignees: Toyota Jidosha Kabushiki Kaisha, Toyota; Denso Corp., Kariya; Fujitsu Net Ltd., Kobe; Toyota Media Station, Nagoya, all of (JP)

( * ) Notice: Subject to any disclaimer, the term of this patent is extended or adjusted under 35 U.S.C. 154(b) by 0 days.

(21) Appl. No.: 09/174,101

(22) Filed: Oct. 16, 1998

(30) Foreign Application Priority Data

Oct. 21, 1997 (JP) ............................................. 9-288725

(51) Int. Cl.⁷ ............................................... H04M 3/42
(52) U.S. Cl. ........................ 455/414; 455/418; 455/456; 455/566
(58) Field of Search ................................. 455/418, 422, 455/456, 457, 566, 575, 414; 340/990, 995, 998, 825.36; 342/450, 457; 701/208, 209

(56) References Cited

U.S. PATENT DOCUMENTS

| | | | |
|---|---|---|---|
| 4,812,843 A | * 3/1989 | Champion et al. | ......... 340/905 |
| 5,029,180 A | 7/1991 | Cowart | |
| 5,048,057 A | 9/1991 | Saleh et al. | |
| 5,123,029 A | 6/1992 | Bantz et al. | |
| 5,287,384 A | 2/1994 | Avery et al. | |
| 5,323,419 A | 6/1994 | Mori et al. | |
| 5,335,276 A | 8/1994 | Thompson et al. | |
| 5,465,401 A | * 11/1995 | Thompson | .................. 455/89 |
| 5,559,520 A | * 9/1996 | Barzegar et al. | ............ 342/357 |
| 5,809,415 A | * 9/1998 | Rossmann | ................. 455/422 |
| 5,838,252 A | * 11/1998 | Kikinis | .................. 340/825.44 |
| 5,905,959 A | * 5/1999 | Foladare et al. | ............ 455/445 |
| 5,974,312 A | * 10/1999 | Hayes et al. | ................ 455/419 |
| 6,002,930 A | * 12/1999 | Sadrozinski et al. | ........ 455/432 |
| 6,009,338 A | * 12/1999 | Iwata et al. | ................. 455/575 |
| 6,091,956 A | * 7/2000 | Hollenberg | ................. 455/456 |

FOREIGN PATENT DOCUMENTS

| | | |
|---|---|---|
| EP | 0 786 646 | 7/1997 |
| EP | 0786646 | * 7/1997 |
| EP | 0 795 835 | 9/1997 |
| EP | 0 803 708 | 10/1997 |
| EP | 0 829 704 | 3/1998 |
| JP | 6-290396 | 10/1994 |
| JP | 8-212060 | 8/1996 |
| WO | 95 01020 | 1/1995 |
| WO | WO96/17315 | 6/1996 |

OTHER PUBLICATIONS

European Search Report, Jan. 18, 2000, EP 22722.

* cited by examiner

Primary Examiner—Thanh Cong Le
Assistant Examiner—Lana Le
(74) Attorney, Agent, or Firm—Kenyon & Kenyon

(57) ABSTRACT

An information center sends an OK message for a log-in and version information for a menu to a moving body terminal device. The moving body terminal device compares the version number of the menu held therein and the informed version number. If they are different, the device asks for menu update. In response to the request, the information center supplies difference data indicative of the difference between the menus of different versions to the moving body terminal device. Using the difference data, the moving body terminal device updates the menu held therein. With this arrangement, the menu used in the moving body terminal device can be effectively updated.

15 Claims, 7 Drawing Sheets

NEW VERSION MENU

| INFORMATION CENTER MENU INFORMATION TO BE OBTAINED ON FOLLOWING CONDITION | |
|---|---|
| RESTAURANTS NEAR PRESENT LOCATION | |
| TYPE | NO DESIGNATION |
| USAGE | DATE IN COUPLE |
| AGE | NO DESIGNATION |
| PHOTO | ATTACHED |

| RETURN | | COMPLETE |
|---|---|---|

OLD VERSION MENU

INFORMATION CENTER MENU
INFORMATION TO BE OBTAINED
ON FOLLOWING CONDITION

RESTAURANTS NEAR PRESENT LOCATION

| TYPE | NO DESIGNATION |
| USAGE | DATE IN COUPLE |
| AGE | NO DESIGNATION |

RETURN  COMPLETE

Fig. 6

NEW VERSION MENU

INFORMATION CENTER MENU
INFORMATION TO BE OBTAINED
ON FOLLOWING CONDITION

RESTAURANTS NEAR PRESENT LOCATION

| TYPE | NO DESIGNATION |
| USAGE | DATE IN COUPLE |
| AGE | NO DESIGNATION |
| PHOTO | ATTACHED |

RETURN  COMPLETE

Fig. 7

| | |
|---|---|
| (1) | THE NUMBER OF CASES n |
| (24) | FIRST AP NAME (NULL FOR NOT MET) |
| (8) | TELEPHONE NUMBER (FOR DATA COMMUNICATION) |
| (8) | LATITUDE, LONGITUDE |
| (24) | SECOND AP NAME (NULL FOR NOT MET) |
| (8) | TELEPHONE NUMBER (FOR DATA COMMUNICATION) |
| (8) | LATITUDE, LONGITUDE |
| | ⋮ |
| (24) | nth AP NAME (NULL FOR NOT MET) |
| (8) | TELEPHONE NUMBER (FOR DATA COMMUNICATION) |
| (8) | LATITUDE, LONGITUDE |

Fig. 8

MOVING BODY TERMINAL DEVICE, INFORMATION PROVIDING DEVICE, INFORMATION PROVIDING SYSTEM, INFORMATION PROVIDING METHOD, AND MEDIUM HAVING RECORDED PROGRAM FOR THE MOVING BODY TERMINAL DEVICE

BACKGROUND OF THE INVENTION

1. Field of the Invention

The present invention relates to a moving body terminal device, an information providing device, an information providing system, an information providing method, and a medium having recorded thereon a program for use in the moving body terminal device. These are used in a system in which the terminal device prepares a search request according to a service menu held therein to send to a center.

2. Description of the Prior Art

Conventionally, an on-line information providing service has widely been used. In such a service, a user at a terminal device accesses an information center via a telephone line, or the like, and sends a search request thereto to obtain a reply therefrom including information and service. As moving body communication prevails, such an on-line service becomes usable from a moving body terminal device which uses a portable terminal device and a vehicle-mounted terminal device.

For example, PCT international publication No. WO96/17315 discloses an on-line information searching system in which a user at a moving body terminal device accesses an information center to obtain a reply which meets predetermined condition from the center.

In using such an on-line information providing service, it is preferable that a user knows the content of the services offered by the center before he accesses the center. That is, if aimed information is available to a user by simply selecting items shown in a service menu screen, the user can obtain desired information with an easy operation. However, it takes time to complete a search request when menu screen data is sent from the information center every time the user applies. In actuality, a shorter access time to the center is desired particularly when a moving body terminal device is used, as an ample communication time may not be ensured or a line may be disconnected halfway through data communication. In this view, the moving body terminal device is preferably loaded with menu data corresponding to the content of the services offered by the information center to display a search menu based on the data so that a user can use the menu to prepare a search request.

By the way, the content of the services by the information center may be updated at any time. If the menu data remains the same on the device side, a user cannot use newly available services. In order to avoid this problem, a search program including service content data may be periodically updated. However, this takes time and cost and still does not always guarantee a user access to the latest service.

SUMMARY OF THE INVENTION

The present invention aims to achieve information searching in which data on new service content from an information center is received and utilized in a terminal device.

According to one aspect of the present invention, there is provided a moving body terminal device, comprising:

a display device;

menu screen generation means for causing the display device to generate a menu screen according to a menu held by the moving body terminal device;

communication means for preparing a search request according to a menu item included in the menu screen generated to send to an information center, and for receiving information in response to the search request; and update means for receiving information concerning a new menu item which is not included in the menu screen to update the menu screen.

With this arrangement, the moving body terminal device can receive new menu content from the information center and update the menu screen held therein. Therefore, it is always possible to update the menu held in the moving terminal device. Particularly, since only the data on the difference between the menu held in the device and the new menu held in the center is transmitted, a communication amount can be reduced. This is effective to maintain relatively low communication costs to update a menu.

Also, preferably, the above device further comprises comparison means for comparing a version number of the menu screen held in the moving body terminal device and a version number of a menu screen held in the information center so that the information concerning a new menu item is received when the version numbers are different.

Through comparison of versions, whether or not the menu on the moving body terminal side needs to be updated can be easily determined. Also, it is easy to prepare difference data in the information center which is necessary to update a menu, and it is also possible to prepare in advance update data among menus of different versions.

Also, in the above device, the menu item preferably relates to search information for facility searching.

When a search condition for facilities is updated, the menu item relative to the facility searching condition is updated so that a user can receive convenient services.

Also, in the above device, the menu item preferably relates to a telephone number of an access point for accessing the information center.

Generally, a user uses a portable phone to access an information center. Calling the nearest access point to the moving body terminal device in use to access an information center may be effective to reduce communication costs. For this purpose, an access point table is preferably provided in the moving body terminal device so that the optimum access point can be selected referring to the table based on the present position of the moving body terminal device. When any change is made to access points, such as addition of a new access point, the change is reflected to the table so that the optimum access point can always be selected.

Also, preferably, the above device further comprises locating means for locating a position of the moving body terminal device, and means for selecting an access point according to the position located.

A moving body terminal device is often equipped with a present position detection device such as a GPS (global positioning system) device. Therefore, according to the present position located by such a device, the optimum access point can be always selected.

Also, preferably, the above device further comprises an access point table concerning an access point corresponding to a communication company so that an access point corresponding to a communication company which deals a portable telephone connected, is selected.

Generally, a plurality of communication companies offer communication services for portable phones, and the portable phones may be handled by different communication companies. By selecting an access point which is handled by a communication company which also handles the moving terminal device in use, smooth communication can be ensured. It is therefore preferable, for example, that an access point table is prepared for every communication company so that a portable phone in use is automatically recognized and a suitable access point table can be selected referring to the table.

Also, in the above device, the new menu item supplied from the information center is compared with the menu item included in the menu held in the moving body terminal device so that menu update data is requested based on a comparison result.

Such a comparison ensures a reliable request of menu update.

Further, according to another aspect of the present invention, there is provided an information providing device, comprising:

information searching means for receiving a search request from a moving body terminal device to send information according to the search request as a reply; and transmission means for, when a service item included in a menu stored in the moving body terminal device is different from a service item about which the information searching means is capable of searching, transmitting data on the difference to the moving body terminal device.

According to still another aspect of the present invention, there is provided an information providing system, wherein a moving body terminal device prepares a search request according to a menu held in the moving body terminal device, and sends the search request prepared to an information center. Further, the information center sends information to the moving body terminal device in response to the search request as a reply, and a new service item which is not set in the menu held in the moving terminal device, and the moving terminal device updates the menu held in the moving terminal device according to the new service item received.

According to yet another aspect of the present invention, there is provided an information providing method for achieving the above operation.

According to yet another aspect of the present invention, there is provided a medium which has a program recorded therein for achieving the above operation. Such a medium is available in the form of a CD-ROM, and stored in a computer, such as an ECU, which is incorporated into a moving body terminal device. Alternatively, it may be supplied from an information center via communication with the moving body terminal device.

BRIEF DESCRIPTION OF THE DRAWINGS

The above and other objects, features, and advantages, will become further apparent from the following description of the preferred embodiment taken in conjunction with the accompanying drawings wherein:

FIG. 6 is a diagram showing a restaurant search menu of an older version;

FIG. 7 is a diagram showing a restaurant search menu of a newer version;

FIG. 8 is a table relating to access points;

DESCRIPTION OF THE PREFERRED EMBODIMENTS

In the following, a preferred embodiment of the present invention will be described with reference to the accompanying drawings.

Figure 1:
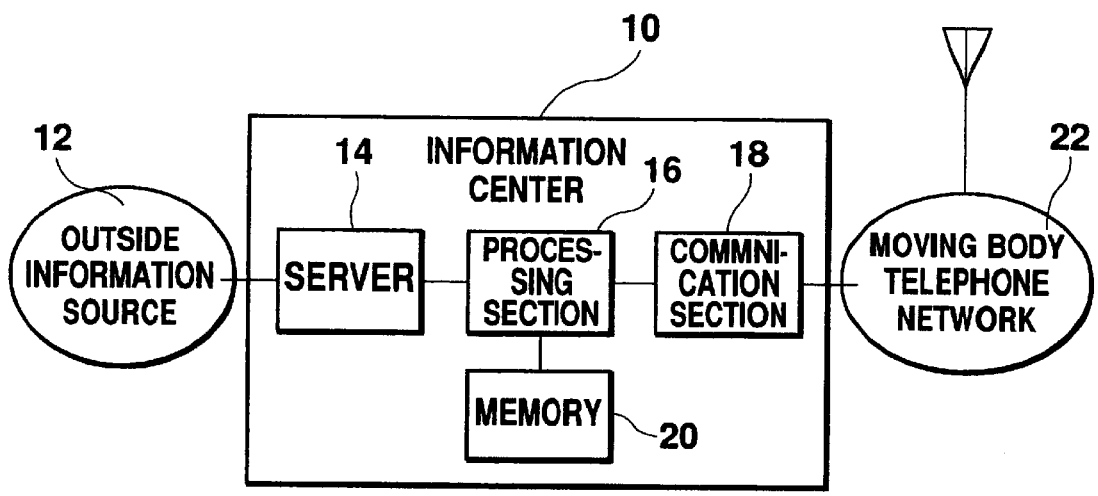
FIG. 1 is a block diagram showing a structure of an information center.

Referring to FIG. 1, which shows a structure of an information center, the information center 10 comprises a server 14, a processing section 16, a communication section 18, and a memory 20. The server 14 is connected to an outside information source 12 and is responsible for communication via electronic mail and acquisition of news and information about traffic, weather, sight-seeing spots, restaurants, parking lots, gas stations, and so on. Note that an outside information source 12 includes various terminals and data bases connected to a communication line such as the Internet. The server 14 is also connected to the processing section 16 for storing or processing, such as searching, received information. The processing section 16 is further connected to the communication section 18, which is in turn connected to a moving body terminal device via the base station of a moving body telephone network 22. Alternatively, the section 18 may be connected directly to a moving body terminal device. The processing section 16 is also connected to the memory 20 for storing the information processed in the section 16. The memory 20 preferably stores a program for the processing in the section 16 which is available as being preferably stored in a CD-ROM or transmitted.

Figure 2:
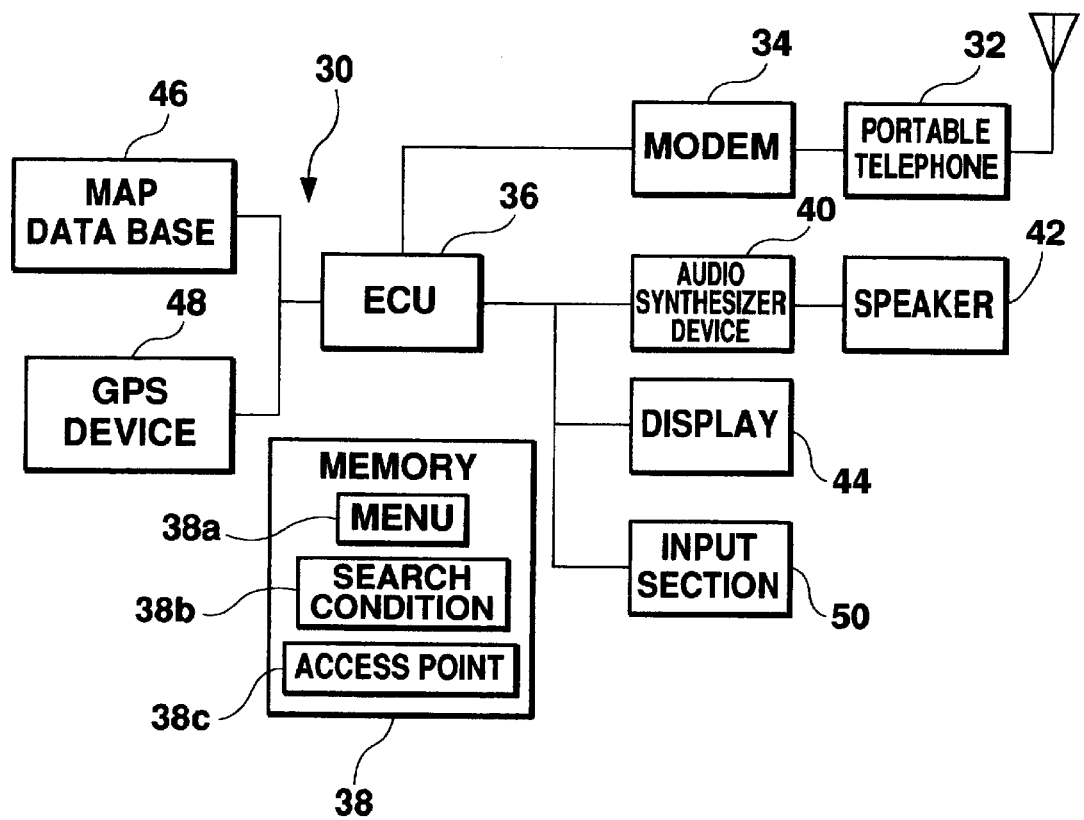
FIG. 2 is a block diagram showing a structure of a moving body terminal device.

In operation, when a user registered to the information center 10 accesses the center 10, the center 10 offers the user various information via an electronic mail, or the like. The user can access the information center 10 either via the communication section 18 thereof or the outside information source 12. Also, since a plurality of access points are provided in the moving body telephone network 22, a user at a moving body terminal can access the information center 10 by calling the nearest access point. Note that a moving body terminal device is connected to an access point via a radio base station. Referring to FIG. 2 showing a structure of a moving body terminal device 30, a moving body telephone 32, which is a portable or car telephone, is connected to the information center 10 via the moving body telephone network 22. In the device 30, the moving body telephone 32 is connected to an ECU 36 via a modem 34. The modem 34 modulates/demodulates data so that the ECU 36 can carry out data communication via the moving body telephone 32.

The ECU 36 is further connected to a memory 38 which is a hard disk or a RAM for storing an application program or data which is necessary for the operation of the ECU 36. The memory 38 stores a menu table 38*a*, a search condition table 38*b*, and an access point table 38*c*. The menu table 38*a* stores menu data for use to display items of services offered by the information center 10. The search By condition table 38b stores data on search conditions corresponding to the service items, the search condition to be informed to the information center 10. The access point table 38c stores data on access points which a user accesses using a moving body telephone 32 to access the information center 10. Preferably, the memory 38 also stores a program for searching information and displaying a menu. The program is preferably available stored in a CD-ROM or transmitted.

The ECU 36 is still further connected to the speaker 42 via an audio synthesizer 40 and to the display 44. The ECU 36 is yet further connected to the input section 50 which comprises not only input buttons but also a touch panel arranged on the front side of the display section 44 via which a user can input various data.

With the above arrangement, a menu for the services offered by the information center 10 is shown on the display 44 and a user sequentially selects items in the menu using the input section 50 to thereby prepare a search request. The prepared search request is sent via the portable telephone 32 to the information center 10, and the center 10 prepares and sends a reply to the device 30. The device 30 either shows the received reply on the display 44 or outputs via the speaker 42.

The ECU 36 is yet further connected to a map data base 46 and a GPS device 48, or the like, so that it can serve as a navigation device capable of route searching and guidance to a destination and displaying a present position. Information displaying and audio outputting which is necessary in navigation is achieved by using the display 44 and the speaker 42. Information is inputted via the input section 50.

Figure 3:
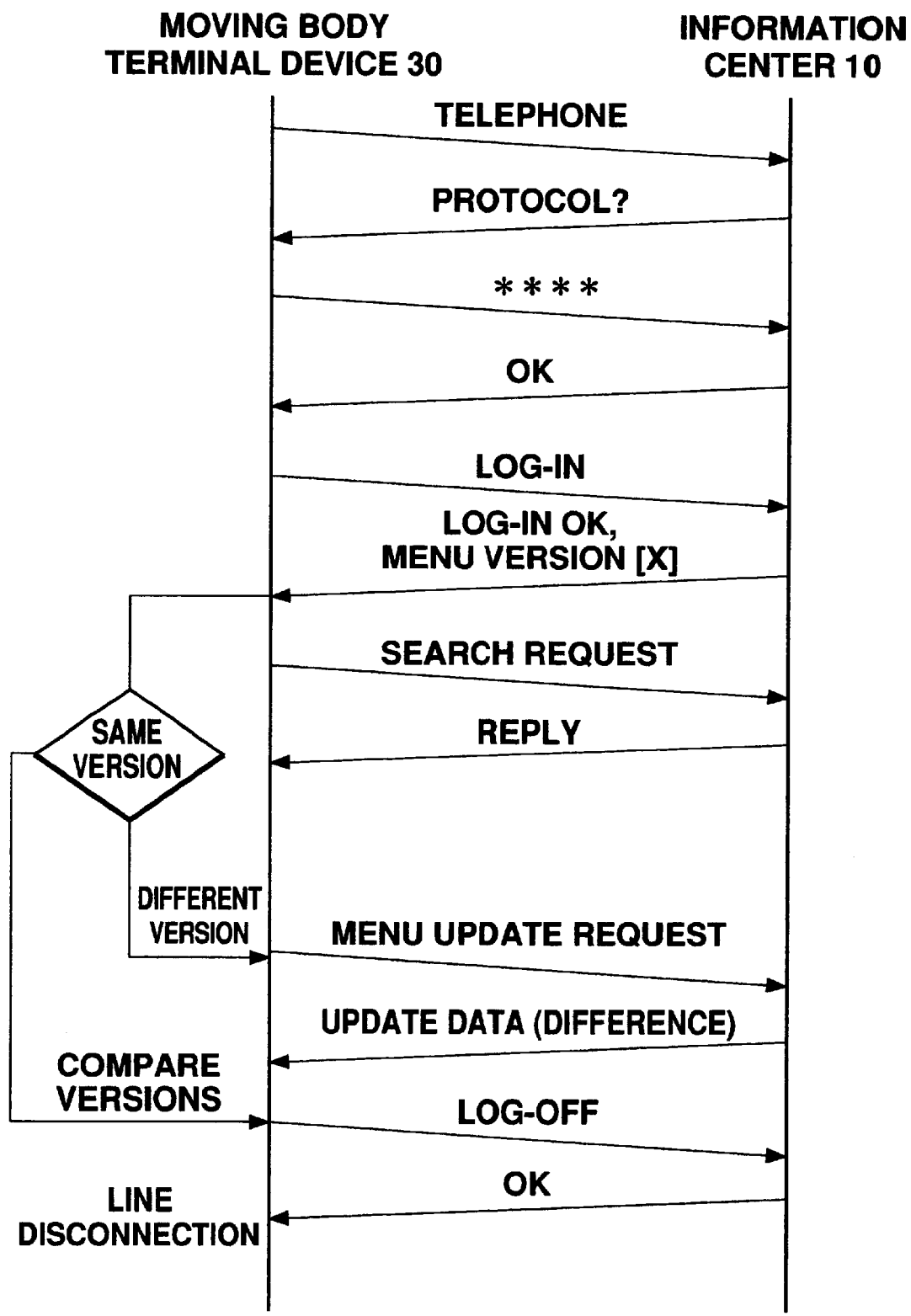
FIG. 3 is a chart for communication.

For information searching, referring to the chart of FIG. 3, a user at a vehicle-mounted moving body terminal device 30 prepares a search request based on the menu shown in the display 44.

The service menu may include, for example, items "real time image", "electronic mail", "news", "weather", "traffic information", "town search", and so on. The user can select any of these using a cursor.

With "real time image" selected, the present situation at various locations are shown in the form of a motion picture. When a particular place is specified, the image of that place is displayed.

For example, with "town search" selected, a search menu appears so that a particular location, such as an area around the present position or a destination, is specified. With a place specified, the next search menu appears which includes items "restaurant", "station", "hospital", "police station", and so on, and the user selects any of these. If "restaurant" is selected, the user is further required to select the type of food (e.g., French or Japanese), reservation type (e.g., two people), and generation, and to determine whether or not a photo and, in the case of "station", a map are necessary. A search request is completed through the above procedure. Note that, in preparing a search request, various modifications can be made according to the type of information and a user's demand.

After a search report is prepared, the user calls a predetermined access point by operating the input section 50 of the moving body telephone 32 to thereby access the information center 10. With the line connected, the center 10 inquires of the device 30 a data communication protocol. The device 30 informs the center 10 of a protocol which the device 30 wishes to use (e.g., an ID ** of the original protocol). If the informed protocol is usable, the center 10 sends an "OK" message to the device 30. In return, the device 30 sends its own ID and a password to the center 10 before logging in. If the log-in is valid, the center 10 accepts the log-in by sending an "OK" message to the device 30, and, according to this embodiment, sends information about the version (Version X here) of the services currently offered by the center 10**.

In response to the "OK" message for the log-in, the device 30 sends the prepared search request (e.g., a request for "news" and information about "weather"and "restaurant near the present location") to the center 10. Based on the received request, the center 10 prepares and sends a reply (e.g., latest news, weather forecast, or a list of restaurants around the present position). Further details, such as the need of a map or a photo, may be preferably discussed through further communication with inquiries and replies. A single search request may concern only a single item or a plurality of items.

Since the device 30 was informed of the version number of the currently available services, as described above, the ECU 36 of the device 30 compares the informed version number with the version number of the service content (=menu) which the device 30 now uses. If they are different, the device 30 sends a request for updating the service menu together with the version information of the service menu held by the device 30. Alternatively, the user may be asked whether or not he wishes menu update.

The version of the service content is updated when any of the menu table 38a, the search condition table 38b, and the access point table 38c is updated on the device 30 side. When any of these currently held tables becomes older on the device 30 side, that fact is recognized and service menu update is requested.

In response to the request, the information center 10 prepares difference data which indicates the difference between service menus of the latest version and of the informed version, and sends the data as update data to the device 30. Difference data among service menus of a plurality of different versions may be stored in advance in the memory 20 of the center 10. Timing for transmitting version information may be changed as desired.

After the device 30 receives a reply to the search request and, if necessary, update data for a service menu, the device 30 sends a log-off message to the center 10. After sending an "OK" message in response to the log-off message, the center 10 completes a series of the above processes on the center 10 side. The device 30 receives the "OK" message and disconnects the line to complete the processes on the device 30 side.

In the above process, when a common menu, which is a menu showing the content of available services, is changed on the center 10 side, a common menu on the device 30 side will be changed as go follows.

Figure 4:
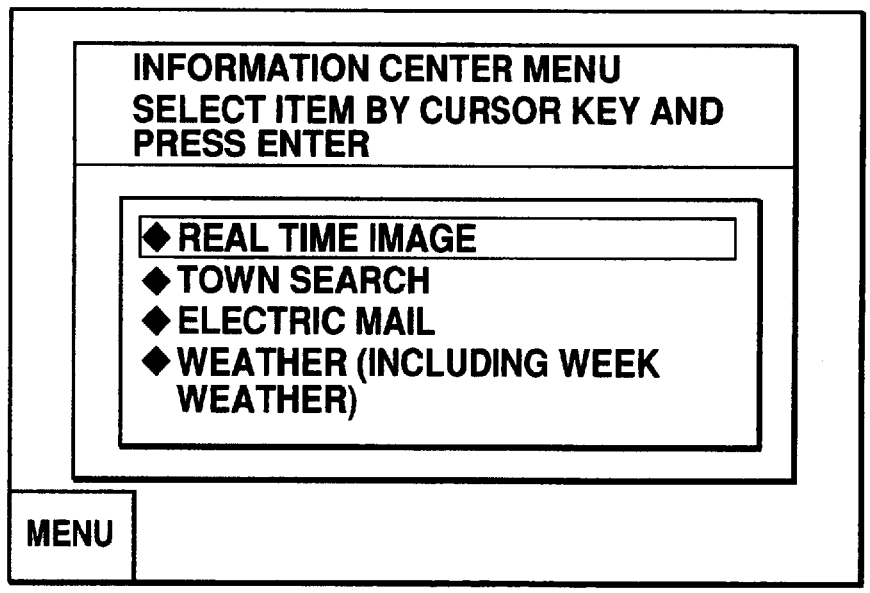
FIG. 4 is a diagram showing common menus of an older version.
Figure 5:
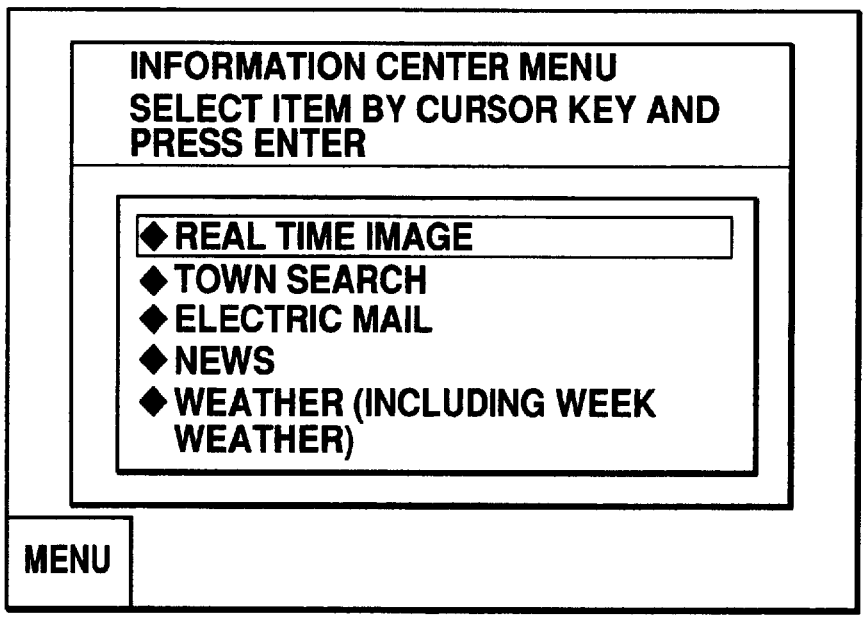
FIG. 5 is a diagram showing a common menu of a newer version.

That is, the device 30 uses a menu (a common menu) as show in FIG. 4, which includes items "real time image", "town search", "electronic mail", and "weather (including week weather)", and the center 10 uses a menu as shown in FIG. 5 which additionally includes "news". In this case, data on the latest common menu used on the center 10 side is sent to the device 30 so that the menu of the latest version as shown in FIG. 5 can be displayed on the device 30 side.

Next, when a search menu relating to restaurants around the present position is changed on the center 10 side, the following process is applied.

That is, the device 30 uses a search menu as shown in FIG. 6, which is of an older version including items "type", "usage", and "generation", while the center 10 uses a search menu as shown in FIG. 7, which is of the latest version additionally including an item for specifying whether or not to attach a "photo". In this case, the center 10 sends data on the search condition table for the latest search menu currently used on the center 10 side to the device 30 so that the older search condition table can be updated on the device 30 side.

Specifically, when the older search condition table is of version "000", while the latest search condition table is of version "001", it is known that the older search condition table must be updated based on the different version numbers. Further, providing that the search condition table in connection with the above search menu is identified as 30H, or a table 30H, when the table 30H of an older version includes items "type", "usage", and "generation", while that of the latest version additionally includes an item concerning a "photo", data on the latest table 30H is sent from the center 10 to the device 30 so that the table 30H held in the device 30 can be updated.

As described above, the ECU 36 updates the menu table 38a, the search condition table 38b, and the access point table 38c on the device 30 side. For updating, the ECU 36 follows the information contained in the update data which instructs the part of an older table to be deleted or changed or to which new data should be added (i.e., a table number in the above example).

Note that the menu table 38a relates to the content of information provided by the information center 10 (i.e., menu items, in other words, what type of information the center 10 can offer); the search condition table 38b relates to a search menu to be displayed after a service menu in the moving body terminal device 30.

According to this embodiment, the access point table 38c, which is used to determine an access point for a user to access the information center 10, is also updated. As shown in FIG. 8, the access point table 38c stores names, telephone numbers (for data communication), and locations (latitude, longitude) of respective access points. The device 30 can select the optimum access point from the access point table 38c based on the present position located by the GPS device 48.

When the access point table 38c is updated, the version of the service menu is updated on the center 10 side. Therefore, the device 30 recognizes a different version, and asks for update data. Then, the center 10 sends data on the latest access point table 38c to the device 30, so that the access point table 38c is updated on the device 30 side.

Note that, since differences among service contents of different versions are recognized by the center 10, the entire set of service content is represented by a single version number in the above. Alternatively, every table may be given a version number.

With this arrangement, the moving body terminal device 30 can always access the information center 10 via the optimum, or nearest, access point. That is, the device 30 can automatically use an access point which is the most inexpensive to the user in terms of communication costs. Specifically, since the moving body terminal device 30 is always aware of its present position using the GPS device 48, the device 30 can select the optimum (nearest) access point while referring to the access point table 38c.

When a moving body terminal device 30 is located substantially equally close to two or more access points, the optimum access point may be preferably determined in consideration of the distance the vehicle with the moving body terminal device 30 will run therefrom to the destination. That is, if the running distance and route are known, the future movement of the vehicle is predictable. Therefore, the optimum access point can be more preferably determined in consideration of the future movement of the vehicle.

By the way, a moving body telephone 32 is often a car or portable telephone and the car or portable telephones are generally handled by a plurality of different communication companies. It is therefore preferable, in selecting an access point, that the ECU 3 recognizes the type of a moving body telephone 32 in use so that the access point selected can be handled by the communication company which handles the moving body telephone 32. For this purpose, the access point table 38c stores data about a relationship between respective access points and communication companies.

There may be two or more information centers 10, to each of which access points are basically assigned in advance.

In the above, the device 30 requests updating of a service menu after having received a reply to the search request. Alternatively, it may initially requests the update so that the device 30 can receive the update data before sending a search request. In this case, the newly received menu is preferably displayed before a search request is sent to the center 10 so that the user can refer to the newly included item and make a search request concerning the new item as well.

If the device 30 prepares a search or service request before connection is established to the center 1, the prepared search request may turn out to be inappropriate in view of the newly received menu or search condition from the center 10. For example, the item "electronic mail" may be included in the older menu stored in the device 30, but may be excluded in the newly received menu due to cancellation. In such a case where a prepared search or service request cannot be fulfilled based on the latest menu, a message, such as "change the search request", may preferably be outputted through a display or a speaker.

As described above, the optimum search request according to the latest condition can be prepared through combination of search condition (menu items) included in the search menu held by the device 30 and search condition (menu items) newly supplied from the information center 10.

Figure 9:
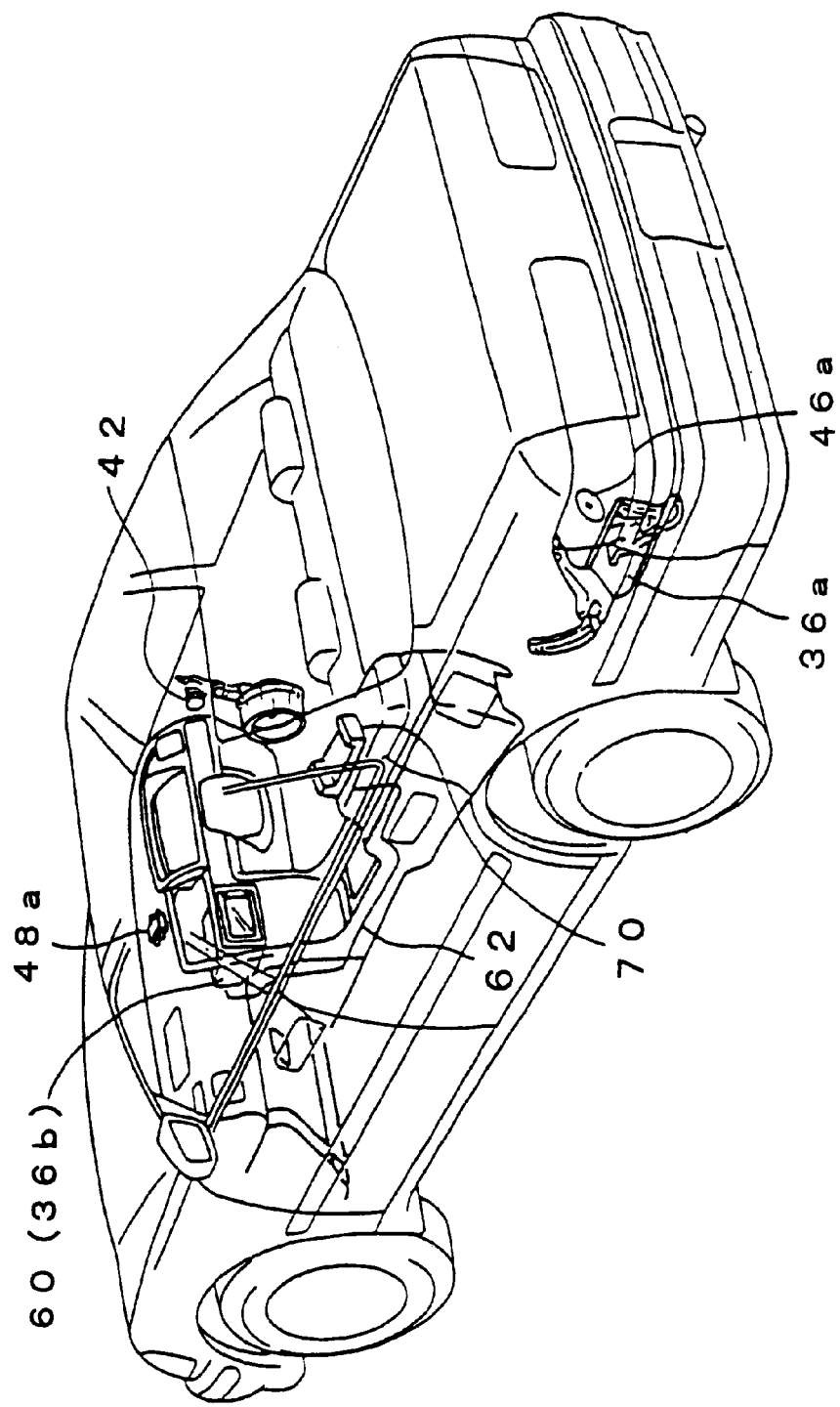
FIG. 9 is a diagram illustrating an image of a moving body terminal device mounted in a vehicle.

Referring to FIG. 9 illustrating a vehicle mounted with a moving body terminal device 30, a GPS antenna 48a constituting a GPS device 48 is mounted to the upper part of the instrument panel inside the vehicle. The ECU 36a and a CD-ROM 46a serving as a map data base for navigation are accommodated inside the rear trunk. The display section 44 and the ECU 36b for information control are integrally made as a wide multi-station 60 and installed in a space between driver and passenger seats. The wide multi-station 60 is connected via a cable 62 to a cradle 70 which enables hands-free use of a moving body telephone 32.

Figure 10:
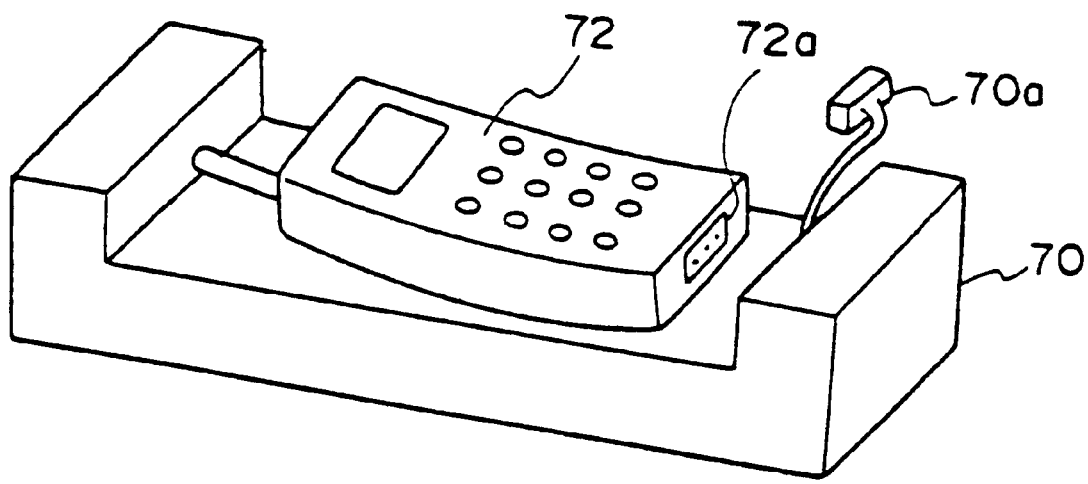
FIG. 10 is a diagram showing a structure of a portable phone.

Specifically, as shown in FIG. 10, a portable telephone 72 which is used as a moving body telephone 32 is carried by the cradle 70 in this embodiment so that the connector connection terminal 72a of the telephone 72 is connected to the connector 70 of the cradle 70 whereby the telephone 72 is connected to the cradle 70. The cradle 70 is connected to various instruments, such as a microphone, a speaker, or a one-touch dial button, for enabling hands-free communication. Set on the cradle 70, the portable telephone 72 can be used as a hands-free telephone.

Various operations are made through an input operation section of the wide multi-station 60.

It should be noted that a moving body telephone 32 is not limited to the above structure, and a dedicated vehicle-mounted telephone system may be preferably installed.

What is claimed is:

1. A moving body terminal device, comprising:

a display device;

menu screen generation means for causing the display device to generate a menu screen according to a menu held by the moving body terminal device, wherein the menu concerns the content of services offered by an information center and the menu screen is generated prior to communicating with the information center.

2. A device according to claim 1, further comprising comparison means for comparing a version number of the menu screen held in the moving body terminal device and a version number of a menu screen held in the information center so that the information concerning a new menu item is received when the version numbers are different.

3. A device according to claim 1, wherein the menu item relates to search information for facility searching.

4. A device according to claim 1, wherein the menu item relates to a telephone number of an access point for accessing the information center.

5. A device according to claim 4, further comprising locating means for locating a position of the moving body terminal device, and means for selecting an access point according to the position located.

6. A device according to claim 4, further comprising an access point table concerning an access point corresponding to a communication company so that an access point corresponding to a communication company which handles a connected portable telephone is selected.

7. A device according to claim 1, wherein the new menu item supplied from the information center is compared with the menu item included in the menu held in the moving body terminal device so that menu update data is requested based on a comparison result.

8. An information providing device, comprising:

information searching means for receiving a search request from a moving body terminal device to send information according to the search request as a reply; and transmission means for transmitting, when a service item included in a menu stored in the moving body terminal device prior to communicating with the information providing device is different from a service item about which the information searching means is capable of searching, data on the difference to the moving body terminal device.

9. A device according to claim 8, wherein the transmission means transmits to the moving body terminal center information about a version number of a menu which includes a service item which the information providing device is capable of offering, and data on the difference between a service item included in the menu and the service item included in the menu stored in the moving body terminal device.

10. An information providing system, wherein a moving body terminal device prepares a search request according to a menu held in the moving body terminal device prior to communicating with an information center, and sends the search request prepared to the information center, the information center sends information to the moving body terminal device in response to the search request as a reply and also sends a new service item which is not set in the menu held in the moving terminal device, and the moving terminal device updates the menu held in the moving terminal device according to the new service item received.

11. An information providing method, comprising the steps of:

preparing a search request in a moving body terminal device according to a menu held by the moving body terminal device prior to communicating with an information center;

sending the search request prepared to the information center;

sending information from the information center in response to the search request as a reply and also sends a new service menu which is not set in the menu held in the moving body terminal device; and updating the menu to the new service item received by the moving body terminal device.

12. A medium having recorded therein a program which causes a computer in a moving body terminal device to perform for information searching the steps of:

having display means generate a menu screen according to a menu held by the moving body terminal device prior to communicating with an information center;

preparing a search request according to a menu item included in the menu screen generated;

sending the search request prepared to the information center;

receiving information in response to the search request and information concerning a new menu item; and updating the menu screen with the new menu item which is not included in the menu screen.

13. A medium according to claim 12, further performing the step of comparing a version number of the menu screen held in the moving body terminal device and a version number of a menu screen held in the information center and receiving the information concerning a new menu item when the version numbers are different.

14. A device according to claim 12, wherein the menu item relates to search information for facility searching.

15. A device according to claim 12, wherein the menu item relates to a telephone number of an access point for accessing the information center.

* * * * *

UNITED STATES PATENT AND TRADEMARK OFFICE
CERTIFICATE OF CORRECTION

PATENT NO.    : 6,349,203 B1                                        Page 1 of 1
DATED         : February 19, 2002
INVENTOR(S)   : Taizo Asaoka et al.

It is certified that error appears in the above-identified patent and that said Letters Patent is hereby corrected as shown below:

<u>Title page,</u>
Change the assignee information as follows:

-- [73] Assignees: Toyota Jidosha Kabushiki Kaisha, Toyota; Denso Corp., Kariya; Fujitsu Ten Ltd., Kobe; Toyota Media Station Incorporated, Nagoya, all of Japan. --

<u>Column 5,</u>
Line 1, delete "By".

<u>Column 6,</u>
Line 53, delete "go".

<u>Column 9,</u>
Line 9, after "information center" change "." to -- ; -- and insert the following:
--       communications means for preparing a search request according to a menu item included in the menu screen generated to send to the information center, and for receiving information in response to the search request; and
         update means for receiving update information from the information center, wherein when said update information indicates that a current menu of the terminal device, the current menu of the terminal device is updated to correspond with the current menu of the information center. --

<u>Column 10,</u>
Line 26, change "sends" to -- sending --.

Signed and Sealed this

Tenth Day of September, 2002

Attest:

Attesting Officer

JAMES E. ROGAN
*Director of the United States Patent and Trademark Office*